Nov. 28, 1961 C. L. DUESLING 3,010,579

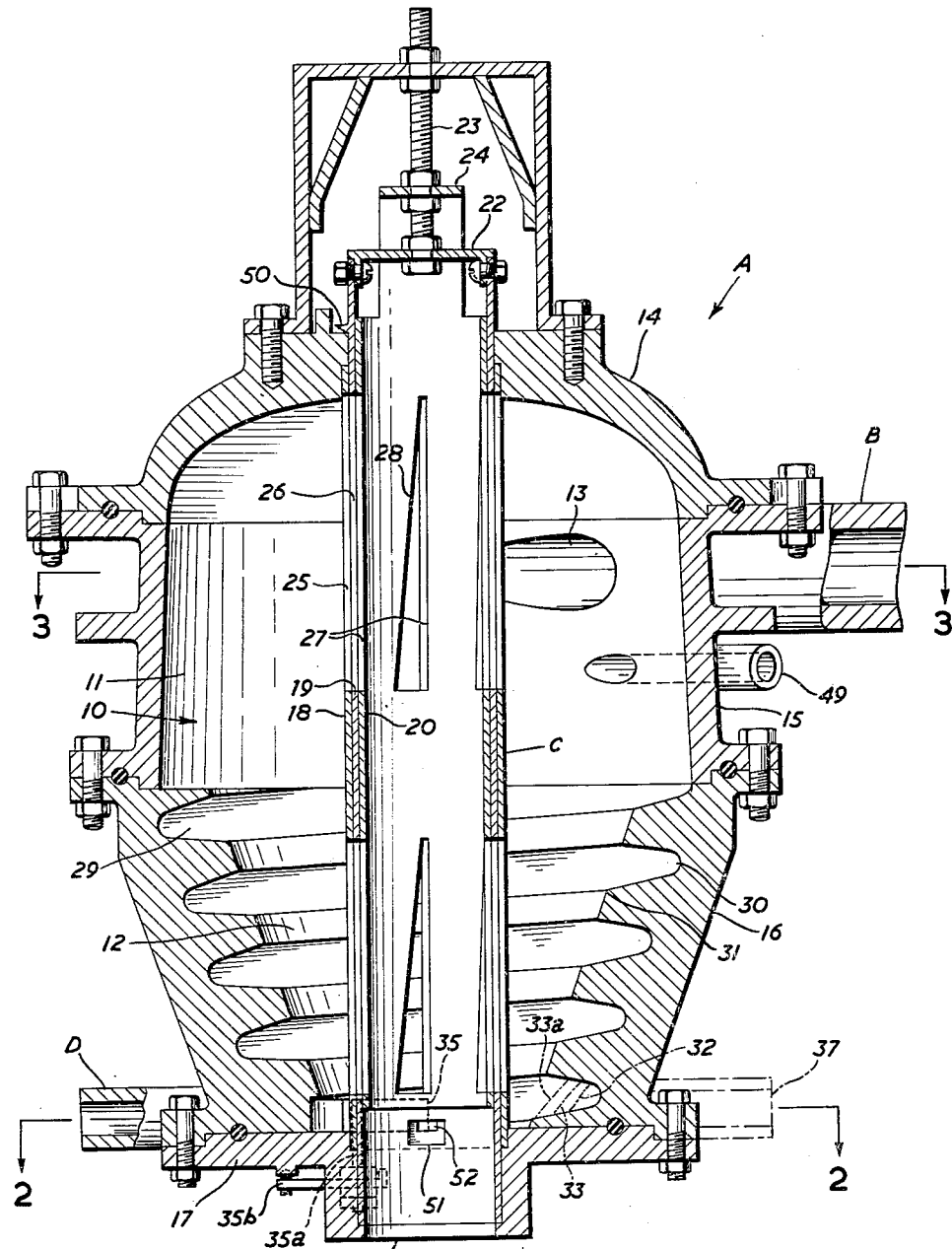

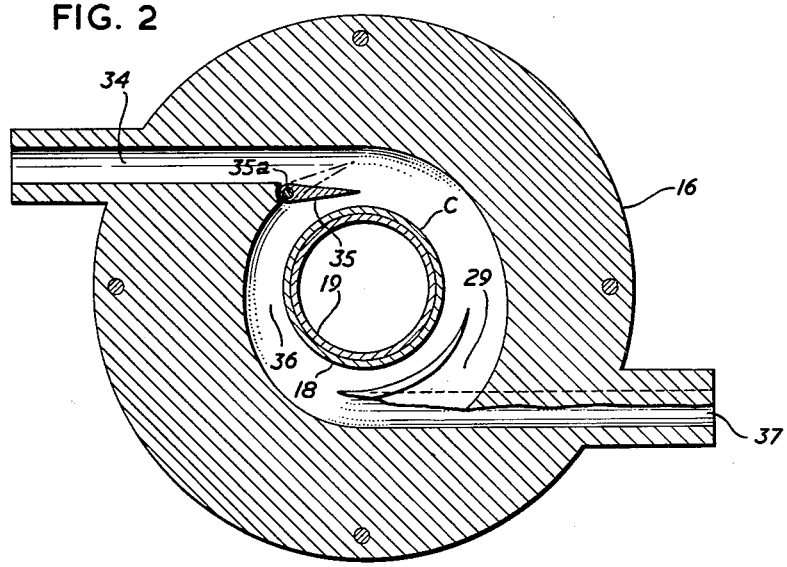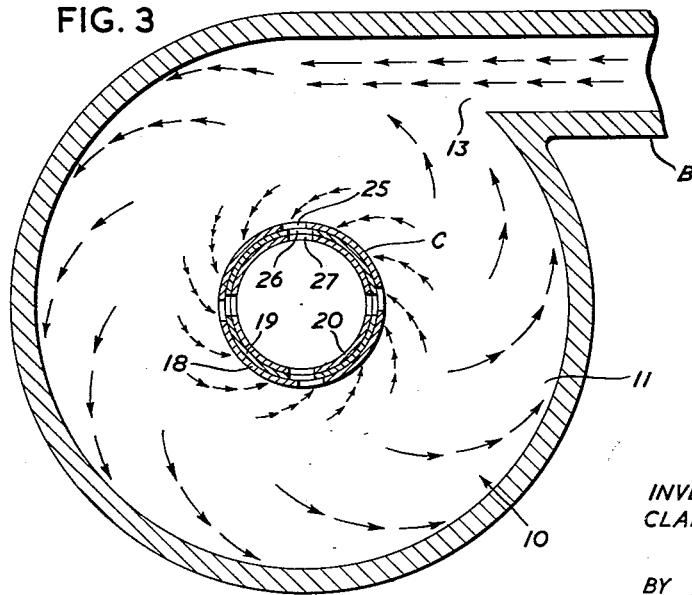

MINERAL DESLIMING, CONCENTRATING AND SEPARATING APPARATUS

Filed Aug. 17, 1959 3 Sheets-Sheet 3

INVENTOR
CLARENCE L. DUESLING

BY *Featherstonhaugh & Co.*
ATTORNEYS

3,010,579
MINERAL DESLIMING CONCENTRATING AND SEPARATING APPARATUS
Clarence Lehi Duesling, 489 English St., London, Ontario, Canada
Filed Aug. 17, 1959, Ser. No. 834,024
15 Claims. (Cl. 209—211)

This invention relates to mineral desliming, concentrating and separating apparatus.

Mineral concentrating and separating apparatus employing centrifugal force to separate the mineral from the sludge has been previously known. In most cases, it has not been possible to obtain as high yield as could be desired, even in the case of iron ore tailings, and in the case of other ore tailings, particularly strategic and precious mineral ores where fine grinding is resorted to for liberation, even lower yields result.

The present invention has for its main object a mineral desliming, concentrating and separating apparatus which is applicable to most ores in which the specific gravity of the mineral is heavier than that of the host rock containing it and which will provide for a reasonably high yield of mineral even in the case of those which are extremely finely ground to liberate them from the rock.

The invention employs centrifugal force as one main factor in separation, centripetal force combined with controlled gravity discharge of slimes as another, a tangential natural discharge of minerals, and a splitting means disposed substantially tangentially to the path of the flow of the mineral, capable of effecting a fine degree of separation as to achieve overall a mineral recovery of high order and which preferably includes a secondary splitting step.

The invention generally embodies a separating chamber of circular cross-section having a central gravity controlled slimes discharge outlet in the bottom thereof and a tangentially discharging concentrate outlet at the bottom thereof adjacent the periphery, an injector for discharging mineral containing sludge into the chamber, and a concentrate splitter disposed substantially tangentially to the path of flow of the concentrate in the bottom of said chamber, including means for adjusting said splitter relatively to the path of flow of concentrate, and means jointly for minutely controlling and adjusting the rate of flow of the slimes discharge and the velocity of the sludge travelling within the concentrating chamber. Preferably the separating chamber is divided into a desliming section and a concentrating section, the latter having a frusto-conical contour, reducing towards the bottom, and including a mineral concentrating channel of maximum length for concentrating the metallics under the influence of centrifugal force and discharging them and heavier foreign material in a natural path in substantially undisturbed condition. Preferably also, a secondary splitting operation is included.

The invention will be clearly understood by reference to the following detailed specification taken in conjunction with the accompanying drawings.

In the drawings:

FIG. 1 is a longitudinal section taken through the mineral concentrating and separating apparatus according to the present invention, FIG. 2 is a section taken on the line 2—2 of FIG. 1.

FIG. 3 is a section taken on the line 3—3 of FIG. 1.

Figure 5:
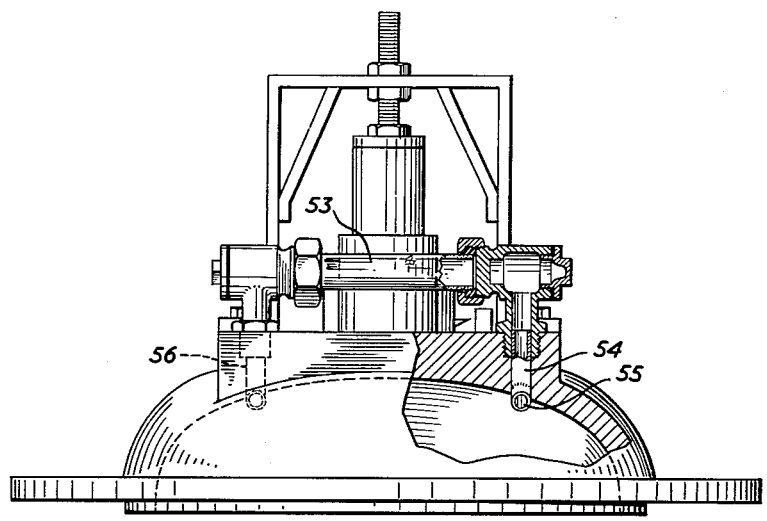
FIG. 5 is a partial sectional view of a sight gauge for determining, and for the purpose of regulation of, the conditions within the separating chamber.

Referring to the drawings, A indicates the desliming, concentrating and separating apparatus as a whole having a separating chamber 10 which is comprised by a desliming section 11 and a frusto-conical concentrating section 12. The separating chamber 10 is fed by an injector B which opens at 13 in the desliming section and the chamber has centrally therethrough a tubular slimes discharge column C and a tangential concentrate discharge D in its base.

This apparatus may be made up of any number of sectional parts convenient to efficient handling of the ore being processed and, as shown in FIG. 1, it is provided with a bonnet or crown 14, a cylindrical body 15 forming the desliming chamber, and a base section 16 forming the concentrating chamber closed by a suitable base plate 17. These sections are all firmly secured together and sealed in any conventional manner.

The sludge containing the minerals to be separated is forced by pump through the injector B and follows a circular path within the desliming section 11 of chamber 10. Due to the velocity of the flow and the abrading action set up between the particles, desliming is effected in the initial travel of the sludge in section 10. Of course, the heavy mineral particles are thrown outwardly under the action of centrifugal force, whereas the fine silica and other foreign particles which make up the slimes become subject to centripetal action and are discharged in novel and natural manner through the tubular slimes discharge column C under force of gravity.

The slimes discharge column C is made up of a plurality of concentric cylinders and preferably for minute control three cylinders, as shown, 18, 19 and 20. These extend completely through the chamber 10 and communicate with the slimes discharge outlet 21 in the base plate 17. The tube 18 is a fixed tube. The tube 19 is a rotatable tube carrying the top yoke 22 connected with the screw threaded rod 23, and secured by lock nuts or the like. Similarly, the tube 20 is adjustable, carrying the cross yoke 24 at its upper end and in turn fastened by means of lock nuts or the like to the threaded rod 23. Consequently, by adjusting the nuts and rotating either of these tubes to the degree desired, an adjustment can be achieved to control area of outlet port therefrom.

The tubes 18 and 19 are provided in their upper area with a series of circumferentially spaced apart corresponding longitudinal slots 25 and 26, respectively (see FIGS. 1 and 3). The tube 20 is provided with a series of circumferentially spaced apart longitudinally extending slots 27, wider at the base than slots 25 and 26, and having a sloped or inclined edge 28 on one side thereof which narrow slot 27 substantially to the width of slots 25 and 26 at its upper end. The slots in all these tubes are preferably of the same length and are disposed at the same elevation so that they can be brought into registry with one another by rotation of the tubes relatively to one another. Consequently, when the slots 25, 26 and 27 of tubes 18, 19 and 20 are brought in full registry with one another, the slime discharge column would be full open. Where, however, the slots 25 and 26 are positioned to provide the smallest passage there through and the slot 27 is superimposed thereon but to a small degree, i.e. with the lower portion of the inclined edge 28 only partially overlapping these slots, then the slots are cut down to a very fine degree of opening for discharge purposes. Adjustments may be made in between these limits and as a result, it will be readily understood that the slime discharge column exercises a high degree of control over the operation of the separator since its adjustment permits a predetermined degree of discharge, but also has the effect of controlling the degree of velocity of the sludge travelling within the chamber. The slots 25, 26 and 27 are repeated in the lower portion of the column within the concentrating section of the chamber so that not only are the lighter slimes discharged directly through the upper series of slots, but the heavier slimes under centripetal action and gravitating downwardly will be discharged through the lower series of slots. Accordingly, it will be understood that the slimes discharge column constitutes one major control element of the apparatus and it will be clear that by its control of the rate of discharge, the degree of velocity within the chamber may be built up to any desired impetus to achieve efficient and controlled concentrating and desliming.

The base section 16 is provided with a continuous concentrating peripheral channel 29 circling the inner periphery thereof which preferably, on one side of the bowl, extends in substantially horizontal reaches and, on the other side of the bowl, is spiralled down to the next level (horizontal reach) so as to achieve a channel of maximum length within the capacity of the base section employed to provide a continuous channel having a base 30 of narrower extent than the mouth 31. Moreover, as indicated, the base section 16 is of frusto-conical form gradually reducing in diameter toward the base. In result, under the action of centrifugal force, the metallics are forced to the narrower base 30 of the channel and by reason of the gradual reducing diameter of the base section, the velocity of the thus concentrated particles is increased to increase the effect of centrifugal force whereby not only the heaviest of the metallics are crowded out to the base of the channel, but finer particles of metallics will also be acted on in a similar way so that a progressively increasing concentrating action results. As indicated in FIG. 1, in effect the metallics will be concentrated substantially within the dotted line 32 and coarser silica and other foreign particles, possibly with fine mineral, will be disposed substantially within the dotted line 33 and coarse silica and foreign particles within dotted line 33a. Moreover, it should be noted that the lower end of the channel 29 terminates in the tangential discharge outlet 34 (FIG. 2) disposed at the outer periphery of the chamber so that the concentrated minerals are maintained in this natural concentrated arrangement up to and through the discharge from the chamber. In fact, it is preferable to form the outer wall of the discharge tube 34 of exactly the same contour as that of the base of the channel so that the concentrate, in effect, is not disturbed from its natural travelling position. Then by locating the splitting blade 35, also substantially tangential to the path of flow of the concentrate and movable to intersect and divide the flow of discharging parts as desired, the heavier silica and other foreign particles lighter than the metallics may be separated and deflected into the waste discharge passage 36 and through the waste discharge outlet 37. As shown in FIG. 2, the waste discharge outlet 37 underlies the final partial convolution of the channel 29 so that a very effective separation of metallics from waste is achieved. Preferably the waste discharge outlet 37 is disposed in opposed relation to the minerals discharge passage but it will be appreciated that it could be disposed substantially at right angles thereto.

The splitting blade 35 is pivotally mounted on the base plate 17 on the shaft 35a which projects outwardly of the base as sown (FIG. 1) and connects with operating lever 35b. The latter may be secured in an adjusted position by means of a set screw or the like so that the splitting blade 35 is adjustable to desired position from the outside of the apparatus.

Figure 4:
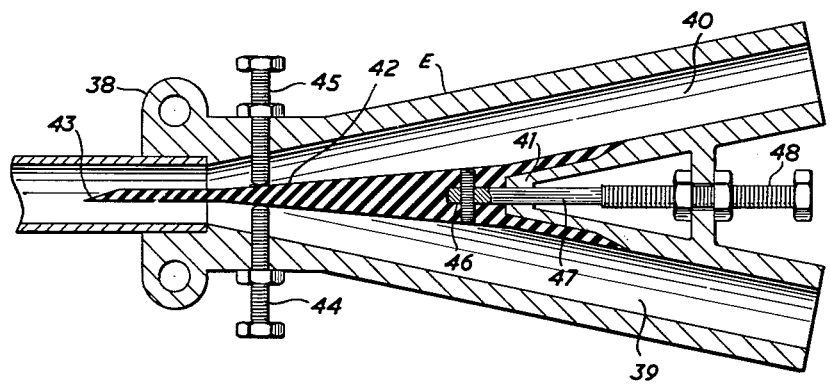
FIG. 4 is a sectional plan view of the secondary splitter.

As shown in FIG. 4, I prefer to employ a secondary splitter E which is provided with a collar 38 or other suitable means to be connected to the projecting end of the discharge tube 34. This is divided into two discharge channels 39 and 40 by means of a partitioning element 41 which in turn mounts the splitter blade 42, preferably made of hard rubber or plastic, terminating in the splitting edge 43. The blade 42 is held in adjusted relation within the splitter E by any suitable means such as the adjustment screws 44 and 45 and by suitable means, such as a square cavity 46 adapted to receive the squared end 47 of the adjusting screw 48, the blade 42 may be rotated to a desired degree. Consequently, the blade edge 43 may be disposed over to one side of the discharge tube 34, including rotational adjustment, as to divide the discharging concentrate into substantially pure mineral concentrate discharging through the passageway 39 and a discharge of middlings through the passageway 40 which can be reprocessed in the apparatus.

To provide for increase in velocity and also a washing of the concentrate, I incorporate a clear water injector conduit 49 (FIG. 1) which opens in a wall of the desliming section 11 and through which clear water is pumped into the chamber under predetermined pressure. This has the effect of increasing the centrifugal action forcing the concentrate more tightly in the passage 29 and effects a washing thereof and tends to speed up the processing. If desired, the clear water injection tube may be formed in a separate section in well known manner and bolted between the desliming chamber 11 and the base section 16. Of course, adjustment of the slime discharge column C is readily made to control discharge therethrough in correlation as well to this water injection phase of the apparatus.

It will be clearly understood that the openings in the cylinders of the slime discharge column C may be varied and may be differently shaped, the preferred type of opening having been illustrated in FIG. 1. Furthermore, in order to provide for easy external adjustment thereof, suitable indicators may be used in conjunction with the tubes 19 and 20 correlated to graduations on the outside of the bonnet or crown. In FIG. 1, I have illustrated the indicating pointer 50 in conjunction with the tube 19. Consequently, adjustment of the tubes may readily be effected from the outside of the apparatus with accurate placement of the various discharge openings in correlation to one another as may be required by conditions prevailing.

Adjacent the bottom of the tubes 18 and 19, an opening may be provided such as the opening 51 in the tube 19 and the smaller opening 52 in tube 18. The opening 52 communicates with the interior of the base section 16 and is designed to permit any large particles of foreign material to pass out therethrough to discharge if, in the case of slight maladjustments or for any other cause, large particles of foreign material might tend to circulate in the base of the chamber. By vertical adjustment of the tube 19, the size of opening 52 may be increased and accordingly adjusted.

For further purposes of control, I provide in the crown or bonnet 14 a glass tube 54 formed with an entrance 55 which is directed in the direction of the path of flow of the sludge within the chamber 10 so that sludge will flow through the opening 55, through tube 54, and glass indicator 53, and discharge through the discharge tube 56 which is directed to enter the chamber and discharge in the path of flow of the circulating sludge. Accordingly, if no flow occurs in tube 53, it is immediately apparent that the chamber is not full and working at capacity so that necessary adjustments may be made. Moreover, if a partial flow only shows in the tube, then similar adjustment can be made whereas the operator may also visually determine from the speed of flow and results obtaining, whether increased velocity or decreased velocity may be desirable.

From the foregoing, it will be appreciated that the apparatus in the present invention will function to achieve a concentration and separation of mineral from the sludge for a high mineral recovery. Due to the fact that the concentrate is passed through the apparatus in a continuous circular path and discharged in a natural path tangential to the path of flow, and due to the minute control of velocity and control discharge of the slimes, it will be clear that even finely ground ore may be readily concentrated and the combination of centrifugal force for concentrating and centripetal action for discharging of the slimes under gravity provides for a smoothly operating concentrator which will avoid substantial turbulence which otherwise might affect the efficiency of the concentrating operation.

I claim:

1. A mineral desliming concentrator and separator comprising a closed chamber of circular cross section having a central gravity controlled slimes discharge outlet in the bottom thereof and a concentrate outlet also in the bottom thereof adjacent its periphery arranged to discharge concentrate substantially tangentially of the chamber, an injector for delivering mineral containing sludge into the chamber tangentially thereto and causing said sludge to flow forcibly through a circular path therein, said injector forcing the heavier mineral content of the sludge towards the wall of the chamber by centrifugal force for discharge through said concentrate outlet and the slimes thereof to the centre of said chamber by centripetal action for gravity discharge through said central slimes discharge outlet, a waste discharge outlet in the bottom of said chamber substantially opposed to the concentrate discharge outlet, a concentrate splitter disposed to intersect the path of flow of the sludge located between said concentrate outlet and said waste outlet, including means for adjusting said splitter relatively to the path of flow of the sludge, to direct waste to the waste outlet and concentrate to the concentrate outlet and means, acting jointly, for controlling and adjusting the rate of flow of the slimes discharge outlet and the velocity of the sludge travelling within the concentrating chamber.

2. A mineral desliming concentrator and separator as claimed in claim 1 in which the lower portion of said chamber is substantially frusto-conical reducing in diameter towards its bottom and is formed with a concentrate channel on the interior wall thereof arranged substantially to spiral downwardly, the lower end of said channel being directed towards said concentrate discharge outlet.

3. A mineral desliming concentrator and separator as claimed in claim 2 in which the lower end of said channel is in registry and connects with the concentrate discharge outlet.

4. A mineral desliming concentrator and separator as claimed in claim 1 in which said chamber is provided with a centrally disposed tubular column passing therethrough and connected with said slimes discharge outlet, said column being orificed for passage of slimes therethrough to said slimes discharge outlet, said adjusting means being a control means for adjusting the orifice size of the column.

5. A mineral desliming concentrator and separator as claimed in claim 4 in which said column is comprised by a plurality of tubes, said adjusting means being means for adjusting said tubes relatively to one another for varying the orifice size.

6. A mineral desliming concentrator and separator as claimed in claim 5 in which three tubes make up the tubular column, two of them being rotatably adjustable and each having a series of orifices therein capable of registration with one another, one of said tubes having orifices of substantially a greater area than the orifices in the other tubes and being of contrasting shape as to provide for fine adjustment of size of orifice passage through said column.

7. A mineral desliming concentrator and separator as claimed in claim 5 in which two of said tubes have orifices adjacent the bottom thereof capable of registration with one another and forming a communication between the base of the chamber and said slimes discharge outlet, the bottom orifice in the outermost of said tubes being smaller than the bottom orifice in the adjacent inner tube of said tubes and means for vertically adjusting the inner of said tubes for varying the overall size of the opening formed by said two bottom orifices.

8. A mineral desliming concentrator and separator as claimed in claim 1 including a secondary splitter providing a tubular passage as a continuation of the concentrate discharge outlet, said passage being divided into two discharge channels and a splitting blade disposed in said passage between and in advance of said discharge channels and directed in the path of flow of said mineral containing sludge in said concentrate discharge outlet and means for adjusting said splitter blade towards one side or the other of said passage as to discharge mineral concentrated sludge in one discharge channel and midlings in the other discharge channel.

9. A mineral desliming concentrator and separator as claimed in claim 8 in which means is provided for rotational adjustment of said splitter blade.

10. A mineral desliming concentrator and separator comprising a closed chamber of circular cross section having a central gravity controlled slimes discharge outlet in the bottom thereof and a concentrate outlet also in the bottom thereof adjacent its periphery arranged to discharge concentrate substantially tangentially of the chamber, an injector for delivering mineral containing sludge into the chamber tangentially thereto and causing said sludge to flow forcibly thorugh a circular path therein, a tubular column extending through said chamber from top to bottom and connecting with said central slimes discharge outlet, said tubular column being orificed for passage therethrough of slimes from said chamber, said injector forcing the heavier mineral content of the sludge towards the wall of the chamber by centrifugal force for discharge through said concentrate outlet and the slimes thereof to the centre of the chamber by centripetal action for gravity discharge through said orificed column, a waste discharge outlet in the bottom of said chamber substantially opposed to the concentrate discharge outlet, a concentrate splitter disposed to intersect the path of flow of the sludge located between said concentrate outlet and said waste outlet, including means for adjusting said splitter relatively to the path of flow of the sludge, to direct waste to the waste outlet and concentrate to the concentrate outlet and means in connection with said column acting jointly for controlling and adjusting the rate of flow of slimes through said column and said slimes discharge outlet and the velocity of the sludge travelling within the concentrating chamber.

11. A mineral desliming concentrator and separator comprising a closed chamber of circular cross section having an upper primary desliming section and a lower concentrating section, the said concentrating section having a central gravity controlled slimes discharge outlet in the bottom thereof and a concentrate outlet also in the bottom thereof adjacent its periphery arranged to discharge concentrate substantially tangentially of the wall of said concentrating section, the latter having a concentrate channel on the interior wall thereof arranged substantially to spiral downwardly, the lower end of said channel being directed towards said concentrate discharge outlet, an injector for tangentially delivering mineral containing sludge into the chamber connected with said primary desliming section and causing said sludge to flow forcibly through a circular path in said chamber, said injector forcing the heavier mineral content of the sludge towards the wall of the chamber by centrifugal force and through said channel for discharge through said concentrate outlet and slimes thereof to the centre of said chamber by centripetal action for gravity discharge through said centre slimes discharge outlet, a waste discharge outlet in the bottom of said chamber substantially opposed to the concentrate discharge outlet, a concentrate splitter disposed to intersect the path of flow of the sludge, located between said concentrate outlet and said waste outlet, including means for adjusting said splitter relatively to the path of flow of the sludge whereby to direct waste to the waste outlet and concentrate to the concentrate outlet, and means, acting jointly, for controlling and adjusting the rate of flow of the discharge outlet and the velocity of the sludge travelling within the concentrating chamber.

12. A mineral desliming concentrator and separator as claimed in claim 1 including a supplementary injector communicating with said chamber for supplemental tangential injection of water to said chamber in the same direction as said sludge is delivered whereby to vary the velocity of the sludge within said chamber and to assist desliming of the sludge.

13. In a mineral desliming concentrator and separator having a chamber of circular cross section, an injector for tangentially delivering mineral containing sludge into said chamber and causing said sludge to flow forcibly through a circular path therein, a base section for said chamber comprising a substantially frusto-conical hollow body reducing in diameter towards its bottom having a concentrate channel circling its interior wall in a substantially spiral path and open to the interior of said body, a concentrate outlet adjacent the lower extremity of said body disposed substantially tangentially to its wall and communicating with said channel, a centrally disposed, gravity controlled, slimes outlet, and a waste outlet disposed in the lower extremity of said body substantially opposed to said concentrate outlet.

14. In a mineral desliming concentrator and separator having a chamber of circular cross section, an injector for tangentially delivering mineral containing sludge into said chamber and causing said sludge to flow forcibly through a circular path, a concentrate outlet in the base thereof discharging concentrate from said chamber, a means for discharging slimes from said chamber comprising a centrally located slimes discharge outlet in the bottom of the chamber and a tubular column comprised by a plurality of tubes extending through said chamber from top to bottom and connecting with said slimes discharge outlet, said tubes each having a series of orifices therein for discharging slimes therethrough by gravity and including means for adjusting said tubes relatively to one another for varying the size of said orifices.

15. In a mineral desliming concentrator and separator as claimed in claim 14, said column having a series of orifices in the upper portion thereof and a series of orifices in the lower portion thereof, the orifices in the upper portion forming discharge means for lighter slimes in the upper portion of the chamber, the orifices in the lower portion of the column forming a means of discharging heavier slimes gravitated towards the bottom of the chamber.

References Cited in the file of this patent
UNITED STATES PATENTS

| | | |
|---|---|---|
| 1,882,329 | Kreisinger | Oct. 11, 1932 |
| 2,709,397 | Banning | May 31, 1955 |
| 2,719,631 | Vicard | Oct. 4, 1955 |
| 2,816,490 | Boadway | Dec. 17, 1957 |
| 2,829,771 | Dahlstrom | Apr. 8, 1958 |
| 2,850,162 | Widmer | Sept. 2, 1958 |
| 2,909,283 | Duesling | Oct. 20, 1959 |